United States Patent [19]

Davis et al.

[11] Patent Number: 5,440,090
[45] Date of Patent: Aug. 8, 1995

[54] DUPLEX STAINLESS STEEL WELDING METHOD

[75] Inventors: Randall L. Davis, Belpre, Ohio; William N. Hill, Lakewood, Colo.

[73] Assignee: Atlantic Richfield Company, Los Angeles, Calif.

[21] Appl. No.: 73,030

[22] Filed: Jun. 7, 1993

[51] Int. Cl.$^6$ .................................. B23K 9/00
[52] U.S. Cl. .................. 219/61; 219/137 WM
[58] Field of Search ........... 219/61, 137 R, 137 WM, 219/125.11, 130.1

[56] References Cited

U.S. PATENT DOCUMENTS

| 3,610,876 | 10/1971 | Bhat ................. | 219/137 R |
| 3,665,147 | 5/1972 | Schobel et al. ........ | 219/130.1 |
| 3,716,691 | 2/1973 | Baybrook et al. ....... | 219/137 R |

FOREIGN PATENT DOCUMENTS 55-73477  6/1980  Japan ..................... 219/61

*Primary Examiner*—Clifford C. Shaw
*Attorney, Agent, or Firm*—Michael E. Martin

[57] ABSTRACT

Duplex stainless steel having about 25% chrome, 7% nickel and 3.5% molybdenum content included in its chemical composition is gas tungsten arc welded by a manual procedure wherein a continuous or segmented root pass weld is made with a filler metal rod of a first diameter and plural cover passes are made in segments or continuously using a filler metal rod of a larger diameter. The weld may be cooled by demineralized water between passes to limit the interpass temperature of the weld to about 300° F. or less. The use of a larger diameter filler rod for the cover passes with a 300° F. temperature limit between passes and segment welds in intermediate and cover passes of 180° reduces time to complete circumferential girth welds for duplex stainless steel pipe by more than 50 percent.

6 Claims, 1 Drawing Sheet

DUPLEX STAINLESS STEEL WELDING METHOD

BACKGROUND OF THE INVENTION

1. Field of the Invention

The present invention pertains to an improved method for welding high chromium duplex stainless steel with relatively large diameter filler metal rod while retaining material toughness and corrosion resistance in the weld and the heat affected zone and adhering to established engineering standards.

2. Background

Duplex stainless steels are alloys of iron, chromium and nickel with a micro-structure consisting substantially of ferrite and austenite or ferrite and martensite. Unique features that distinguish duplex stainless steels from other classes of stainless steels are their ability to accommodate a high chromium and molybdenum content. These elements control pitting and crevice corrosion resistance, have good resistance to chloride stress corrosion and high strength. In this regard, chrome duplex stainless steels are ideal for certain oil and gas field applications such as hot seawater processing systems and similar systems which handle generally corrosive fluids under relatively high pressures. Accordingly, the use of these materials is advantageous in complex fluid distribution systems such as are found in oil field production fluid gathering systems and enhanced recovery operations such as water flood systems. These systems include complex piping networks and manifolds which require substantial fabrication, most of which is done by manual as well as machine welding.

One consideration in using duplex stainless steel for corrosive fluid handling piping and vessels is the time required to fabricate the systems, in particular the time required to perform welds between various pipe sections, for example. Since it is generally accepted that the micro-structures of duplex stainless steels are, in general, notably changeable with heating such as by welding, and that these changes in micro-structure influence the corrosion resistance of the material, welding methods have been required to be modified to prevent excessive heating of the weld area. This, generally, has required that relatively small diameter weld filler wire or rod be used in the welding operation to minimize heat generated at the weld. Accordingly, the weld material deposited in the weld area per pass of the filler material is relatively low and several passes, with interpass cooling of the weld, have been required to prevent overheating and consequent decrease of the corrosion resistance and toughness of the material.

However, with this background in mind, an improved method of welding duplex stainless steels has been developed wherein rather unexpected improvements in welding speed and reduced fabrication time have been realized while adhering to certain specifications of desired material properties such as impact toughness and corrosion resistance. It is to this end that the present invention has been developed with a view to providing substantial improvements in time required for fabricating piping and similar structural members by welded chrome duplex stainless steels, in particular.

SUMMARY OF THE INVENTION

The present invention provides an improved welding procedure for duplex stainless steel, particularly a high chromium-nickel duplex stainless steel wherein the time to complete an arc weld is substantially reduced without adversely affecting the physical properties of the weld or the structure in the vicinity of the weld.

In accordance with an important aspect of the present invention, a chrome duplex type stainless steel is weldable by a gas tungsten arc welding process wherein recommended temperatures in the weld area are maintained through a combination of interpass cooling of the weld, segment welding for girth welds, in particular, and using a combination of filler metal rods of different diameters which substantially reduce the time to complete a weld.

In accordance with another important aspect of the present invention, duplex stainless steel, having principal alloy metals of about 25% chrome, 7% nickel and 3.5% molybdenum are welded at faster rates using a procedure involving liquid cooling of the weld between passes and using weld filler rods of different diameters for the root pass and the cover passes of the weld. The overall combination of steps involved in making girth welds on pipes and similar structures, in particular, provides a significant advantage in reducing the time to complete the weld without adversely affecting the toughness or corrosion resistance of the material in and in the vicinity of the weld.

Those skilled in the art will further appreciate the improved welding method upon reading the detailed description which follows.

BRIEF DESCRIPTION OF THE DRAWING

FIG. 1 is a diagram showing the arrangement of a gas tungsten arc welding torch and filler rod preparatory to making a manual girth weld on a pipe section or the like;

DESCRIPTION OF A PREFERRED EMBODIMENT

Figure 1:
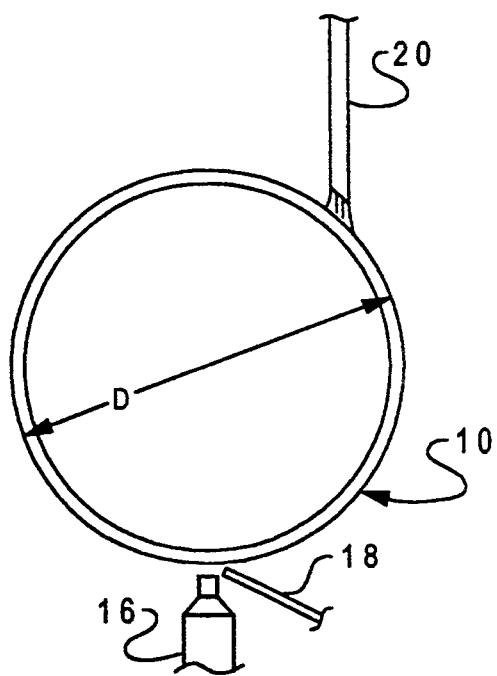

Certain weldable alloy materials require a substantial length of time to weld in order to minimize overheating of the material in the vicinity of the weld. Such materials as duplex stainless steels, if over-heated during welding, undergo changes which affect the strength and corrosion resistance of these materials. Accordingly, the producers of these materials normally specify a maximum welding heat input and a maximum metal temperature between passes of the welding torch or machine. Duplex stainless steels have a relatively low maximum interpass temperature and a preferred material which may be used in the method of the present invention has a recommended maximum interpass temperature of about 300° F. This material is a 25% chrome duplex stainless steel which is sold under the trademark ZERON 100 by Weir Materials Services, Ltd. of Manchester, England. The ZERON 100 duplex stainless steel has a nominal chromium content of 25%, a nickel content of 7% and a molybdenum content of 3.5%. The ferrite/austenite phase balance is controlled to give approximately 35% to 65% austenite. This material has superior corrosion resistance and strength for corrosive fluid handling systems such as produced water and seawater processing systems for oil field applications.

One of the more stringent environments for corrosive fluid handling systems is in the North Slope oil fields of Alaska where materials are routinely subjected to ambient temperatures of −50° F. Accordingly, the materials used for the above-noted types of fluid handling systems must meet rather rigorous criteria and the above-mentioned duplex stainless steel has been determined to be suitable for certain fluid handling applications in such an environment. However, heretofore the fabrication time for certain components made of duplex stainless steel has been excessive when conventional arc welding processes have been implemented while adhering to (a) heating requirements of this material during such welding processes, and (b) predetermined material toughness and corrosion resistance specifications in the weld and the heat affected zone. Accordingly, there has been an acute need to reduce the time required to weld such material, particularly so-called field welding onsite using manual welding processes and equipment.

The improved welding method of the present invention is particularly advantageous for circumferential girth welds between pipe sections or between pipe sections and connections to pressure vessels and the like which meet certain requirements of notch toughness and corrosion resistance in the weld area. In accordance with the present invention, a duplex stainless steel of the type above mentioned has been welded by a gas tungsten arc welding process using a manual gun or torch and filler metal of a predetermined diameter rod compatible with the chemical properties of the material of the parts being fabricated.

For example, in welding two cylindrical pipe sections together using a gas tungsten arc welding gun or torch, a filler metal rod of chemistry compatible with the chemistry of the pipe material and maintaining an interpass or intersegment temperature (the temperature of the weld between welding passes) less than about 300° F., a baseline time to complete a weld was established. In the example given below, certain parameters of the welding method and the weld material are set forth. Basically, the time to complete a weld using a filler metal rod of predetermined diameter, a manual gas tungsten arc welding torch and water cooling of the material between passes of the welding torch proved to be excessive. One significant improvement in the time required to complete a weld was realized by cooling the weld with demineralized water between passes of the torch through the weld area. For example, by cooling the weld with demineralized water immediately after completing a pass, the temperature in the weld between passes, i.e. the interpass temperature or intersegment temperature, was reduced to the maximum allowable in a much more rapid time than by permitting ambient or forced air cooling. Welding times using water cooling were nominally reduced by 50%.

However, further reductions in time were sought for certain welds since it was realized that, for example, welding cylindrical pipe sections together having a diameter (D) of 6.00 inches, a 0.250 inch wall thickness, of the above-mentioned type of duplex stainless steel and using 0.094 inch diameter filler metal rod still required substantial time to complete a girth weld while meeting impact toughness and corrosion resistance requirements. Moreover, it was further discovered that, by utilizing a larger diameter filler wire or rod during all passes or weld segments after the root pass, the total number of passes and time to complete a weld was substantially reduced. A weave technique, rather a stringer technique, in the intermediate and cover passes was also advantageously utilized to reduce welding time.

Figure 2:
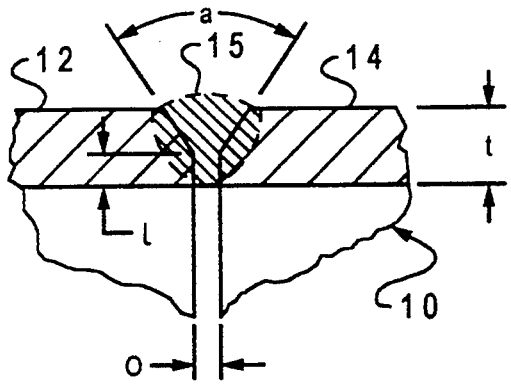
FIG. 2 is a diagram illustrating the geometry of one preferred joint configuration for the welding method of the present invention.

FIG. 1 of the drawing indicates the general arrangement for the welding procedure of the present invention for making a weld on cylindrical pipe 10. As shown in FIG. 2, separate sections of pipe 12 and 14 having a standard bevel joint geometry of an included angle "a" of 75° are joined by a transverse girth weld 15. The reference letter "t" indicates the material thickness, the reference letter "l" indicates the thickness of the "land" and the reference letter "o" indicates the spacing or root opening between the pipe sections 12 and 14.

Referring again to FIG. 1, the welding procedure 10 is carried out with a conventional manual welding torch 16 and with the use of filler metal rod 18. The weld is preferably cooled by the application of demineralized water from a conduit 20 or any other suitable source. The illustration in FIG. 1 is exemplary only. The water, when needed, may be applied by several methods and, of course, must be applied sufficiently spaced away from the welding operation itself or after completion of each welding pass or segment to prevent interference with the welding operation.

Figure 3:
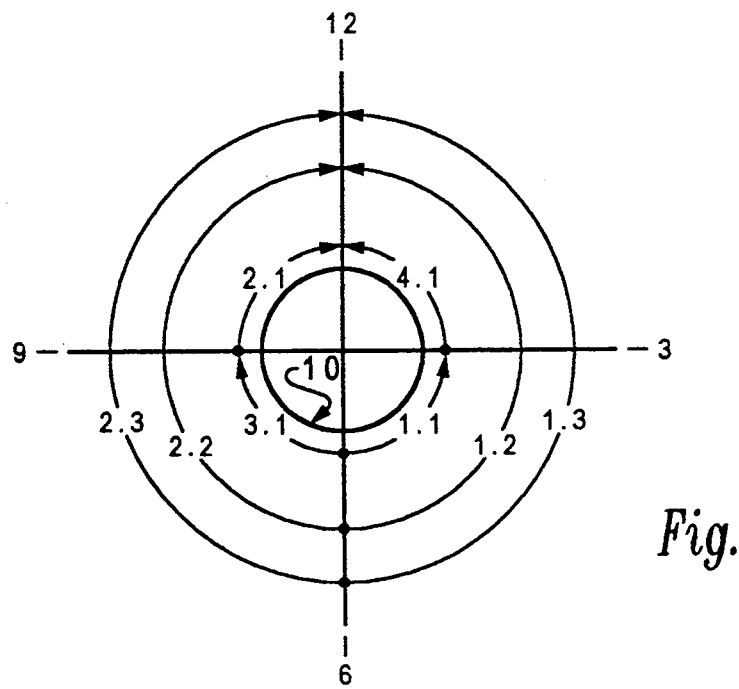
FIG. 3 is a schematic diagram indicating a preferred sequence of welding in accordance with the method of the present invention.

FIG. 3 is a diagram of one preferred method of welding a cylindrical pipe in accordance with the present invention. In the improved method, the weld is carried out by making so-called circular segment welds of approximately 90° arc, each, for the root pass and segments of 180° arc for the cover passes. It is contemplated that welding may be carried out in 360° arcs or even continuously if the weld temperature does not exceed the maximum recommended temperature. In the exemplary weld procedure, the root pass was carried out with four 90° segments. The first segment of the first pass is designated by the numeral 1.1, the second segment of the first pass is designated by the numeral 2.1, the third segment of the first pass is designated by the numeral 3.1 and the fourth segment of the first pass is designated by the numeral 4.1. The weld is completed with 180° segments for each of two cover passes as indicated in FIG. 3. Each segment is started at the dot at the "three o'clock", "six o'clock" or "nine o'clock" positions as indicated and completed at and in the direction of the arrowhead for the respective numbered pass segments.

Table I below gives pertinent data of a manual gas tungsten arc welding process using filler metal wire or rod of different diameters for the root and cover passes in accordance with the preferred method of the invention, example (1), as compared with using the same and smaller diameter wire or rod for all passes, example (2). Although the heat input for the cover passes in the preferred method is greater than with the constant diameter filler rod for all passes, by allowing the interpass temperature of the weld to reach the limit of 300° F., the weld time was substantially reduced, as indicated. In both welding methods water cooling of the weld between passes or segments was carried out. The manual torch was a direct current type, negative electrode.

Welds in both examples (1) and (2) were shielded and back purged by 99.999% pure argon gas. Interpass temperatures of the weld were measured by a digital readout type contact pyrometer. Filler metal rods were chemically compatible with the ZERON 100 steel and were provided by Weir Material Services as their Medrode ZERON 100 and by Thyssen Schweisstechnik GMBH as their Thermanit 25/09 CuT.

TABLE I

|  | (1) | (2) |
|---|---|---|
| Diameter - D | 6.0 in. | 6.0 in. |
| Land - 1 | .031–.062 in. | .031–.062 in. |
| root - o | .094–.125 in. | .031 in. |
| Amps - root | 95 | 85 |
| Amps - cover | 125 | 110 |
| Volts - root | 8.75–9.25 | 9.0 |
| Volts - cover | 9.50–10.0 | 9.0 |
| Speed - root - ipm | 1.75–4.22 | 1.5–2.0 |
| Speed - cover - ipm | 2.25–5.70 | 3.5–4.5 |
| Heat - j/in - root pass | 21,500 | 21,500 |
| Heat - j/in - cover passes | 21,500* | 12,000 |
| Filler rod dia - root pass | .094 in. | .094 in. |
| Filler rod dia. - cover passes | .125 in. | .094 in. |
| Interpass temp - °F. | 300° F. | 212° F. |
| Charpy Impact (−50° F.) | 48–148 ft. lbs. | 74–152 ft. lbs. |
| Ferrite Count | 25%–58% | 25%–55% |
| No. passes | 3 | 8 |
| Total time | 50 min. | 2 hrs. 15 min. |

*Intermediate or "hot" pass preferably made at 65%–75% of heat input of root pass. Cover pass heat input at or less than heat input of root pass.

It will be noted from Table I that, with comparable torch voltages and amperages, travel speeds and heat input in the root pass, the total time to complete the weld with the different diameter wires or rod in the root, intermediate and cover passes was significantly reduced when allowing the interpass temperature to reside at the maximum value of 300° F. The impact energy values given are those encountered in carrying out an ASTM standard Charpy v-notch impact test at −50° F. on weld specimens with "v" notches at the weld centerline, the fusion line and up to 0.188 in. from the fusion line. A v-notch impact value of 40 to 50 ft. lbs. at −50° F. was predetermined as a minimum acceptable specification. The ferrite count is taken from an ASTM standard corrosion test (G-48).

By definition, a weld pass for a circumferential girth weld is defined as one complete circumferential pass of the torch even though one pass is preferably conducted in 90° or "quarter" segments for the root pass and 180° segments for the intermediate and cover passes, followed by cooling of each weld after each segment pass. It is indicated from Table I that, by using the larger filler metal rod for the so-called intermediate and cover passes (second and third passes) of the weld and by not exceeding the maximum interpass or intersegment temperature, the number of passes required to complete the weld and the total time to complete the weld are both significantly reduced without sacrificing impact toughness or corrosion resistance. All other parameters are relatively comparable for the two welds on pipe 10 of the same diameter. The intermediate or hot pass in the exemplary weld was made at a heat input rate in joules per inch of weld (j/in.) of 65% to 75% of the heat input of the root pass. The cover pass heat input was preferably at a rate not exceeding the root pass rate. A relatively greater heat input is required in the cover passes of the preferred method due to the larger diameter filler rod.

Although a preferred embodiment of the present invention has been described in detail hereinabove, those skilled in the art will recognize that various substitutions and modifications may be made to the method described without departing from the scope and spirit of the invention as recited in the appended claims.

What is claimed is:

1. A method for welding sections of generally cylindrical pipe of duplex stainless steel having a chromium content of about 24 percent to about 26 percent, a nickel content of about 6 percent to about 8 percent and a molybdenum content of about 3 percent to about 4 percent, said welding being carried out by electric arc welding with a gas shielded tungsten electrode comprising the steps of:

making at least one circumferential root weld between end to end, abutted sections of pipe using a filler metal rod of a first diameter wherein said at least one circumferential root weld is formed by making a plurality of separate segment welds about the circumference of said abutted pipe sections:

making at least one circumferential cover weld using a filler metal rod of a second diameter greater than said first diameter to form said weld wherein said at least one circumferential cover weld is formed by making a plurality of separate segment welds over said at least one circumferential root weld.

2. The method set forth in claim 1 wherein:
sais cover passes are made using a weave technique of applying said filler metal rod to said weld.

3. The method set forth in claim 1 wherein:
the maximum temperature of said weld between passes is limited to about 300° F.

4. The method of claim 1 including the step of:
cooling each of said plurality segments of both said at least one circumferential root weld and said at least one circumferential cover weld with demineralized water after each respective segment is formed.

5. The method set forth in claim 1 wherein:
said second diameter is about 25 percent greater than said first diameter.

6. The method of claim 1 wherein each of said plurality of said at least one circumferential root weld extends through a 90° arc about said circumference of said abutted pipe sections; and wherein
each of said plurality of said at least one circumferential cover weld extends through a 180° arc about said circumference of said abutted pipe sections.

* * * * *